United States Patent
Lee et al.

(10) Patent No.: US 8,633,131 B2
(45) Date of Patent: Jan. 21, 2014

(54) MESOPOROUS OXIDE-CATALYST COMPLEX AND METHOD OF PREPARING THE MESOPOROUS OXIDE-CATALYST COMPLEX

(75) Inventors: Doo-hwan Lee, Suwon-si (KR); Hyun-chul Lee, Hwaseong-si (KR); Sang-min Ji, Suwon-si (KR); Kyo-sung Park, Seongnam-si (KR); Seung-jae Lee, Suwon-si (KR); Seon-ah Jin, Pocheon-si (KR)

(73) Assignee: Samsung Electronics Co., Ltd. (KR)

( * ) Notice: Subject to any disclaimer, the term of this patent is extended or adjusted under 35 U.S.C. 154(b) by 196 days.

(21) Appl. No.: 12/915,959

(22) Filed: Oct. 29, 2010

(65) Prior Publication Data
US 2011/0105310 A1    May 5, 2011

(30) Foreign Application Priority Data
Oct. 30, 2009  (KR) .................. 10-2009-0104427

(51) Int. Cl.
| | | |
|---|---|---|
| *B01J 23/00* | (2006.01) | |
| *B01J 23/40* | (2006.01) | |
| *B01J 23/42* | (2006.01) | |
| *B01J 23/58* | (2006.01) | |
| *B01J 23/60* | (2006.01) | |
| *B01J 23/72* | (2006.01) | |
| *B01J 23/56* | (2006.01) | |
| *B01J 23/44* | (2006.01) | |
| *B01J 23/70* | (2006.01) | |
| *B01J 23/74* | (2006.01) | |
| *B01J 23/02* | (2006.01) | |
| *B01J 23/20* | (2006.01) | |
| *B01J 23/08* | (2006.01) | |
| *H01M 8/00* | (2006.01) | |
| *H01M 8/06* | (2006.01) | |

(52) U.S. Cl.
USPC ........... 502/300; 502/308; 502/309; 502/310; 502/311; 502/312; 502/313; 502/314; 502/315; 502/316; 502/317; 502/318; 502/319; 502/320; 502/321; 502/322; 502/323; 502/325; 502/326; 502/327; 502/328; 502/329; 502/330; 502/331; 502/332; 502/333; 502/334; 502/335; 502/336; 502/337; 502/338; 502/339; 502/344; 502/345; 502/346; 502/349; 502/350; 502/351; 502/352; 502/353; 502/354; 502/355; 429/400; 429/423; 429/425

(58) Field of Classification Search
USPC ......... 502/300, 308–323, 325–339, 344–346, 502/349–355; 429/400, 423, 425
See application file for complete search history.

(56) References Cited

U.S. PATENT DOCUMENTS

| | | | | |
|---|---|---|---|---|
| 5,545,602 A | * | 8/1996 | Nelson et al. | 502/314 |
| 5,786,294 A | * | 7/1998 | Sachtler et al. | 502/349 |
| 6,358,486 B1 | | 3/2002 | Shan et al. | |
| 7,585,808 B2 | * | 9/2009 | Malek et al. | 502/300 |
| 2003/0017943 A1 | * | 1/2003 | Shan et al. | 502/243 |
| 2006/0094596 A1 | * | 5/2006 | Komatsu et al. | 502/325 |
| 2010/0330451 A1 | * | 12/2010 | Shinozaki et al. | 429/482 |

FOREIGN PATENT DOCUMENTS

| | | |
|---|---|---|
| KR | 1020050050659 A | 5/2006 |
| KR | 1020080101993 A | 11/2008 |

* cited by examiner

*Primary Examiner* — Patricia L Hailey
(74) *Attorney, Agent, or Firm* — Cantor Colburn LLP

(57) ABSTRACT

A mesoporous oxide-catalyst complex including: a mesoporous metal oxide; and a catalyst metal supported on the mesoporous metal oxide, wherein the catalyst on the mesoporous metal oxide has a degree of dispersion of about 30 to about 90 percent.

25 Claims, 12 Drawing Sheets ved to Korean Patent Applica-
MESOPOROUS OXIDE-CATALYST COMPLEX AND METHOD OF PREPARING THE MESOPOROUS OXIDE-CATALYST COMPLEX

CROSS-REFERENCE TO RELATED APPLICATIONS

This application claims priority to Korean Patent Application No. 10-2009-0104427, filed on Oct. 30, 2009, and all the benefits accruing therefrom under 35 U.S.C. §119, the content of which in its entirety is herein incorporated by reference.

BACKGROUND

1. Field

The present disclosure relates to a mesoporous oxide-catalyst complex and methods of preparing the same.

2. Description of the Related Art

In general, mesoporous metal oxides have larger pores and a greater surface area than microporous metal oxides, and thus it is expected that they will be applicable to various fields such as catalysts, absorbents, sensors, and storage media. For example, with respect to catalysts, when a mesoporous metal oxide with a large surface area and large pores is used in a chemical reaction, mass transport limitations between reactants and products, which occur when a microporous metal oxide is used, are decreased, and thus the reaction efficiency may increase.

A mesoporous metal oxide, such as a single oxide or an oxide complex including a transition metal oxide, such as NiO, may be used directly as an oxidation catalyst. In addition, a mesoporous metal oxide is widely used in a form of a metal catalyst carrier. Such catalysts have been widely used in energy and environmental applications, such as hydrotreating, hydrogenation, dehydrogenation, petroleum reforming, chemical processing in fuel cells, and for $CO_2$ conversion.

Heterogeneous catalysts, in which a metal catalyst is supported in a metal oxide, may be generally prepared by deposition precipitation, coprecipitation, wet impregnation, sputtering, gas-phase grafting, liquid-phase grafting, or incipient-wetness impregnation. However, these methods are performed in multi-step processes by preparing a metal oxide carrier, dispersing a catalyst metal precursor on a surface of the metal oxide carrier, and then heat treating and reducing the resulting product. In addition, the particles of the metal catalyst should have a diameter on a nanometer scale, and, to increase the dispersion of the metal catalyst, additional processes, such as surface treatment and selection of acid-base properties of a carrier, are currently utilized. Therefore there remains a need for an improved catalyst material, and improved methods of preparation thereof.

SUMMARY

Provided is a mesoporous oxide-catalyst complex with a large surface area, a large pore size, and including a catalyst metal uniformly distributed therein.

Provided is a method of preparing the mesoporous oxide-catalyst complex.

Additional aspects, features and advantages will be set forth in part in the description which follows and, in part, will be apparent from the description.

According to an aspect, a mesoporous oxide-catalyst complex includes a mesoporous metal oxide; and a catalyst metal supported on the mesoporous metal oxide, wherein the catalyst metal on the mesoporous metal oxide has a degree of dispersion of about 30 to about 90 percent.

The catalyst metal may include a transition metal.

The catalyst metal may include at least one of nickel (Ni), iron (Fe), copper (Cu), cobalt (Co), chromium (Cr), platinum (Pt), palladium (Pd), ruthenium (Ru), or iridium (Ir).

The catalyst metal may be Ni.

The mesoporous metal oxide may include at least one oxide of a metal of a Group 4 element, a Group 5 element, a Group 6 element, aluminum, gallium, indium, thallium, silicon, germanium, tin, lead, phosphorous, arsenic, antimony, or bismuth.

The mesoporous metal oxide may include at least one oxide of at least one of silicon (Si), aluminum (Al), titanium (Ti), zirconium (Zr), tungsten (W), molybdenum (Mo), vanadium (V), tantalum (Ta), niobium (Nb), or phosphorus (P).

The mesoporous metal oxide may include at least one of $ZrO_2$, $SiO_2$—$Al_2O_3$, $SiO_2$—$ZrO_2$, $Al_2O_3$—$ZrO_2$, and $CeO$—$ZrO_2$.

The metal oxide may be crystalline.

An amount of the catalyst metal may be about 0.1 to about 40 mass percent, based on a total amount of the mesoporous oxide-catalyst complex.

The mesoporous metal oxide may have an average mesopore diameter of about 1 to about 50 nanometers (nm).

The mesoporous metal oxide may have an average mesopore diameter of about 4 to about 15 nm.

The mesoporous metal oxide may have a surface area of about 20 square meters per gram ($m^2$/g) or greater.

According to another aspect, a method of preparing a mesoporous oxide-catalyst complex includes: contacting a catalyst metal precursor, a metal oxide precursor, and a solvent to obtain a mixture; forming from the mixture a mesoporous structure in which a catalyst metal is included in a lattice structure of a metal oxide, calcining the mesoporous structure to obtain a mesoporous metal oxide complex; and selectively reducing a catalyst metal oxide of the mesoporous metal oxide complex to prepare the mesoporous oxide-catalyst complex.

The solvent may be include an alcohol and aqueous acid.

The catalyst metal precursor may include an alkoxide, a halide, a nitrate, a hydrochloride, a sulfate, or an acetate of a transition metal.

The catalyst metal precursor may include an alkoxide, a halide, a nitrate, a hydrochloride, a sulfate, or an acetate of at least one metal of Ni, Fe, Cu, Co, Cr, Pt, Pd, Ru, or Ir.

The catalyst metal precursor may be a Ni nitrate.

The metal oxide precursor may be an alkoxide, a halide, a nitrate, a hydrochloride, a sulfate, or an acetate of at least one metal of a Group 4 element, a Group 5 element, a Group 6 element, aluminum, gallium, indium, thallium, silicon, germanium, tin, lead, phosphorous, arsenic, antimony, or bismuth.

The metal oxide precursor may be an alkoxide, a halide, a nitrate, a hydrochloride, a sulfate, or an acetate of Si, Al, Ti, Zr, W, Mo, V, Ta, Nb, or P.

The calcining may be performed at a temperature of about 300 to about 1,000° C. in air for about 0.1 to about 30 hours.

The reducing may be performed at a temperature of about 300 to about 1,000° C. in a gas including hydrogen for about 0.01 to about 10 hours.

Also disclosed is method of preparing a mesoporous oxide-catalyst complex. The method includes: contacting a catalyst precursor, a mesoporous oxide precursor, and a solvent; removing the solvent by evaporation to provide a mixture; calcining the mixture to provide a mesoporous metal oxide complex; and selectively reducing a catalyst metal of the mesoporous metal oxide complex to prepare the mesoporous oxide-catalyst complex.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
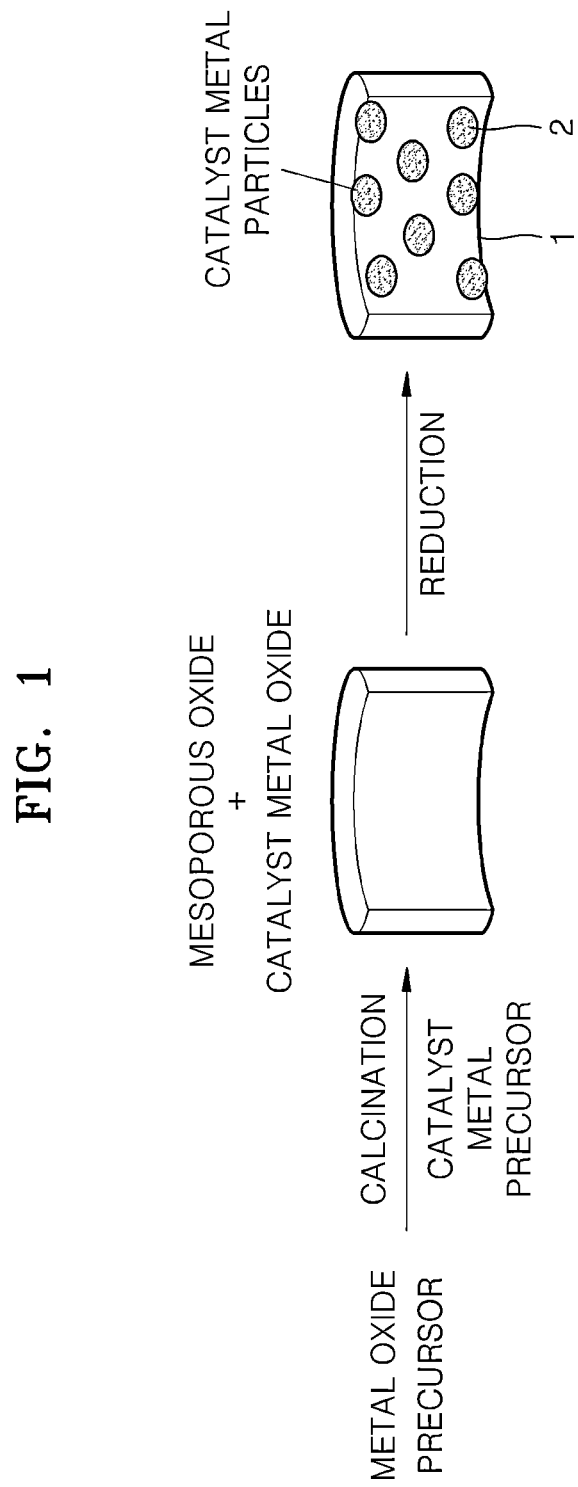
FIG. 1 is a schematic diagram illustrating an embodiment of a method of preparing a mesoporous oxide-catalyst complex.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to further explain aspects, features, and advantages of the present description.

As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an embodiment of a mesoporous oxide-catalyst complex will be disclosed in further detail.

A mesoporous oxide-catalyst complex may include a mesoporous metal oxide 1; and a catalyst metal 2 supported on the mesoporous metal oxide, wherein a degree of dispersion of the catalyst metal on the mesoporous metal oxide is about 30 to about 90 percent. Herein, degree of dispersion refers to dispersion as determined from hydrogen chemisorption.

Unlike a commercially available catalyst complex, which may be prepared by preparing a carrier and then supporting a catalyst metal on the carrier, for the disclosed mesoporous oxide-catalyst complex, when a metal oxide carrier (e.g., a mesoporous structure) is prepared, a catalyst metal component is included as a substituent in a lattice structure of the metal oxide carrier, and then the catalyst metal component may be selectively reduced, thereby forming a mesoporous metal oxide-catalyst complex. In addition, the catalyst metal may be uniformly distributed in (e.g., on) the metal oxide carrier in the form of a particle, and the particle may be, for example, a nanoparticle.

The catalyst metal of the mesoporous oxide-catalyst complex may be a transition metal, for example, at least one metal of nickel (Ni), iron (Fe), copper (Cu), cobalt (Co), chromium (Cr), platinum (Pt), palladium (Pd), ruthenium (Ru), or iridium (Ir). In an embodiment, the metal is Ni. In an embodiment of the preparation of the mesoporous oxide-catalyst complex, a catalyst metal may be included in the lattice structure of the metal oxide and selectively substituted in the lattice structure in the form of an ion of the catalyst metal.

Because the catalyst metal has a uniform degree of dispersion in the mesoporous oxide-catalyst complex, the degree of dispersion of the catalyst metal is increased. The degree of dispersion of the catalyst metal may be about 30 to about 90, specifically about 40 to about 80, more specifically about 50 to about 70 percent. Because the catalyst metal is distributed in such a uniform range, the amount of the catalyst metal supported on the metal oxide may be increased. The catalyst metal may be supported on the metal oxide in an amount of about 0.1 to about 40 mass percent (mass %), specifically about 5 to about 20 mass %, more specifically about 10 mass %, based on the total amount of the mesoporous complex catalyst.

A carrier on which the catalyst is supported may be a mesoporous metal oxide, and the carrier may comprise at least one oxide of a metal of a Group 4 element, a Group 5 element, a Group 6 element, aluminum, gallium, indium, thallium, silicon, germanium, tin, lead, phosphorous, arsenic, antimony, or bismuth, wherein "Group" refers to a Group of the Periodic Table of the Elements in the International Union of Pure and Applied Chemistry ("IUPAC") Group 1-18 group classification system. For example, the mesoporous metal oxide may comprise at least one oxide of silicon (Si), aluminum (Al), titanium (Ti), zirconium (Zr), tungsten (W), molybdenum (Mo), vanadium (V), tantalum (Ta), niobium (Nb), or phosphorus (P). In an embodiment, the mesoporous metal oxide may be a single metal oxide, such as $ZrO_2$, or may comprise at least one metal oxide complex of $SiO_2$—$Al_2O_3$, $SiO_2$—$ZrO_2$, $Al_2O_3$—$ZrO_2$, or $CeO$—$ZrO_2$.

The mesoporous metal oxide may have a crystalline or a non-crystalline structure, and the structure of the mesoporous metal oxide may be determined by analyzing the structure of the resulting product.

Because the mesoporous metal oxide has a mesopore, the mesoporous metal oxide may have a larger surface area and larger pore area than a material without a mesopore. For example, the mesoporous metal oxide may have an average (e.g., average largest) mesopore diameter (e.g., pore diameter) of about 1 to about 50 nanometers (nm), specifically about 4 to about 15 nm, more specifically about 8 to about 10 nm. In addition, the mesoporous metal oxide may have a surface area of about 20 square meters per gram ($m^2/g$) or greater, specifically about 40 to about 900 $m^2/g$, more specifically about 80 to about 800 $m^2/g$.

A method of preparing the mesoporous oxide-catalyst complex, in which the catalyst metal is dispersed to provide a high degree of dispersion in the mesoporous metal oxide will now be disclosed in further detail.

FIG. 1 is a schematic diagram illustrating an embodiment of a method of preparing a mesoporous oxide-catalyst complex. Referring to FIG. 1, first, a metal oxide precursor and a catalyst metal precursor are contacted in (e.g., added to) a solvent to prepare a mixture. From the mixture is formed a mesoporous structure in which a catalyst metal is included in the lattice of the metal oxide. The mesoporous structure is calcined to obtain a mesoporous metal oxide complex, and then the catalyst metal is selectively reduced to provide the catalyst metal on the mesoporous metal oxide. As a result, the mesoporous oxide-catalyst complex is prepared in which the catalyst particles are no longer within the lattice structure, but rather are uniformly distributed on the mesoporous metal oxide. It is to be understood that "on" in this context is not limited to the surface of the bulk material, but includes within the bulk material as well.

The solvent used to mix the precursors may be an alcohol solvent, such as methanol or ethanol, or may be a mixture of an alcohol solvent and an acid, such as an aqueous solution of hydrochloric acid or an aqueous solution of acetic acid. The amount of the solvent is not particularly limited, and may be about 0.1 to about 40 parts by weight, specifically about 1 to about 30 parts by weight, more specifically about 10 to about 20 parts by weight, based on 100 parts by weight of the catalyst metal precursor and the metal oxide precursor.

The mixture prepared by contacting the metal oxide precursor and the catalyst metal precursor in the solvent may further include a structural derivative. The structural derivative may provide the metal oxide carrier with a molecular backbone (e.g., support) when the metal oxide carrier is prepared, and may be a neutral surfactant. Examples of the neutral surfactant may include PLURONIC F108, or PLURONIC F127, which is a triblock copolymer of polyethyleneoxide/polypropyleneoxide/polyethyleneoxide ("PEO/PPO/PEO").

The catalyst metal precursor may be an alkoxide, a halide, a nitrate, a hydrochloride, a sulfate, or an acetate of a transition metal. However, the catalyst metal precursor is not particularly limited, and may be any catalyst metal precursor capable of forming a metal oxide by calcination. The transition metal used to form the catalyst metal precursor may be at least one metal of Ni, Fe, Cu, Co, Cr, Pt, Pd, Ru, or Ir. In an embodiment, the transition metal is Ni. The amount of the catalyst metal precursor may be about 0.1 to about 40 parts by weight, specifically about 1 to about 30 parts by weight, more specifically about 10 to about 20 parts by weight, based on 100 parts by weight of the solvent.

The metal oxide precursor may be an alkoxide, a halide, a nitrate, a hydrochloride, a sulfate or an acetate of at least one metal of a Group 4 element, a Group 5 element, a Group 6 element, aluminum, gallium, indium, thallium, silicon, germanium, tin, lead, phosphorous, arsenic, antimony, or bismuth. For example, the metal oxide precursor may be an alkoxide, a halide, a nitrate, a hydrochloride, a sulfate, or an acetate of an element of Si, Al, Ti, Zr, W, Mo, V, Ta, Nb, or P, but is not limited thereto.

When a single metal oxide precursor is used, a single metal oxide carrier may be formed, and when at least two kinds (e.g., types) of metal oxide precursors are used, a metal oxide carrier complex may be formed. The single metal oxide carrier may comprise $ZrO_2$, and the metal oxide carrier complex may comprise at least one of $SiO_2$—$Al_2O_3$, $SiO_2$—$ZrO_2$, $Al_2O_3$—$ZrO_2$, or $CeO$—$ZrO_2$.

The amount of the metal oxide carrier may be about 0.1 to about 40 parts by weight, specifically about 1 to about 30 parts by weight, more specifically about 10 to about 20 parts by weight, based on 100 parts by weight of the solvent, but is not limited thereto.

The mixture, which includes the solvent, the catalyst metal precursor, and the metal oxide precursor, and further optionally may include the acid or structural derivative, if desired, may be stirred at room temperature for about 0.1 to about 10 hours, specifically about 1 to about 5 hours, so that each of the components may be uniformly dispersed therein.

The obtained mixture may be maintained at room temperature at ambient pressure for about 1 to about 50 hours, specifically about 1 to about 5 hours, in an open state, and thus a volatile solvent component included in the mixture may be removed by evaporation, for example. The maintaining time is not particularly limited, and may be any time sufficient to effectively or sufficiently remove the volatile solvent component.

If desired, an aging process may be further performed on the resulting product obtained after the volatile solvent components are removed. The aging process may enhance cohesion between atoms constituting the resulting structure, and may be performed at a temperature of about 30 to about 100° C., specifically about 40 to about 90° C., more specifically about 50 to about 80° C. for about 6 to about 48 hours, specifically about 8 to about 40 hours, more specifically about 10 to about 30 hours.

Subsequently, the resulting product after the aging process may be calcined so that each precursor is in the form of an oxide. The calcination process may be performed at a temperature of about 300 to about 1,000° C., specifically about 400 to about 900° C., more specifically about 400 to 600° C. at about atmospheric pressure for about 0.1 to about 30 hours, specifically about 1 to about 10 hours, more specifically about 5 hours.

Each precursor may be converted into a metal oxide by the calcination process. In the calcination process, the mesoporous metal oxide carrier is formed, and the catalyst metal oxide (e.g., the catalyst metal) is included as a substituent in the lattice structure of the mesoporous metal oxide carrier so that the catalyst metal oxide is uniformly disposed therein.

Subsequently, the catalyst metal oxide is selectively reduced. Thus the metal oxide maintains the mesoporous structure, and the structure of the mesoporous metal oxide does not substantially collapse. The reduction process may be performed at a temperature of about 300 to about 1,000° C., specifically about 400 to about 900° C., more specifically about 400 to about 600° C., in a hydrogen atmosphere for about 0.01 to about 10 hours, specifically about 0.1 to about 5 hours, more specifically about 3 hours.

In an embodiment, the mesoporous oxide-catalyst complex may be provided by a process including only calcining and reducing the catalyst metal precursor and the metal oxide precursor, and thus the manufacturing cost may be low. Also, the particle diameter of the catalyst metal included in the metal oxide carrier may also be selected by selection of a reaction condition. In addition, the catalyst metal precursor and the metal oxide precursor may be desirably reacted simultaneously to form a mesoporous carrier, and the mesoporous carrier may then be reduced to disperse the catalyst metal in the carrier, and thus the mesoporous structure may be maintained and a higher degree of dispersion of the catalyst metal may be obtained. Therefore, the mesoporous oxide-catalyst complex, which provides a high degree of dispersion and large pore area, may be prepared at low manufacturing cost and with high efficiency.

The mesoporous oxide-catalyst complex prepared above may be used in various chemical reactions, for example in hydrogenation, dehydrogenation, hydrotreatment, a fuel cell (e.g., hydrocarbon reforming), or $CO_2$ conversion, for example.

In a fuel cell, when a higher hydrocarbon or an unsaturated hydrocarbon is used as a fuel, a reforming reaction using a catalyst may be employed. During the reforming reaction, carbon deposition occurs. When the carbon deposition occurs at an excessive level, the formed carbon is deposited in a reactor and may undesirably cause an increase in pressure. As a result, continuous reforming may be difficult. When the disclosed mesoporous oxide-catalyst complex is used as a catalyst for hydrocarbon reforming, carbon deposition may be effectively eliminated or substantially prevented. While not wanting to be bound by theory, the effective elimination of carbon deposition is believed to be due to the high degree of dispersion of the catalyst metal and large pore area. Accordingly, the reforming reaction may be performed continually.

The catalyst for the reforming of hydrocarbons including the mesoporous oxide-catalyst complex may be used in a fuel processing device for a fuel cell. The fuel processing device may include a reforming device including the catalyst for hydrocarbon reforming. The catalyst for hydrocarbon reforming may be disposed in a stationary-phase tubular reactor or disposed in a mixed flow reactor, but is not limited thereto.

An embodiment will now be disclosed in further detail with reference to the following examples. These examples are for illustrative purposes only and are not intended to limit the scope of the present invention.

Example 1

Preparation of the Mesoporous Oxide-Catalyst Complex 1 Ni/3SiO$_2$-3Al$_2$O$_3$

A 4.6 gram (g) quantity of a triblock copolymer (Product Name: PLURONIC F127; EO-PO-EO, MW=12,000), 1.97 milliliters (mL) (36 wt %) of HCl, and 2.4 g of acetic acid were added to 300 mL of ethanol at room temperature, and the mixture was stirred to obtain a uniform, mixed solution. Then 5 millimoles (mmol) of a Ni(NO$_3$)$_2$-6H$_2$O precursor was added to the mixed solution to obtain a uniform, mixed solution. Then 17.5 mmol of the silica precursor tetraethyl orthosilicate ("TEOS") and 17.5 mmol of the aluminum precursor aluminum tri-sec-butoxide was added to the resulting mixture and the mixture stirred at a rapid speed for 2 hours.

The resulting mixture was put in a Petri dish, and the ethanol was evaporated at room temperature at atmospheric pressure for 24 hours. Then, an aging process was performed on the resulting product at 65° C. in an air atmosphere for 12 hours. The aged product was then calcined at 500° C. in an air atmosphere for 4 hours, and heated at 500° C. in a hydrogen atmosphere for 2 hours to selectively reduce NiO in the calcined product to Ni. As a result, a mesoporous oxide-catalyst complex of the formula 1 Ni/3SiO$_2$-3Al$_2$O$_3$ was prepared. The obtained metals had a molar ratio of Ni:Si:Al of 1:3:3.

Figure 2:
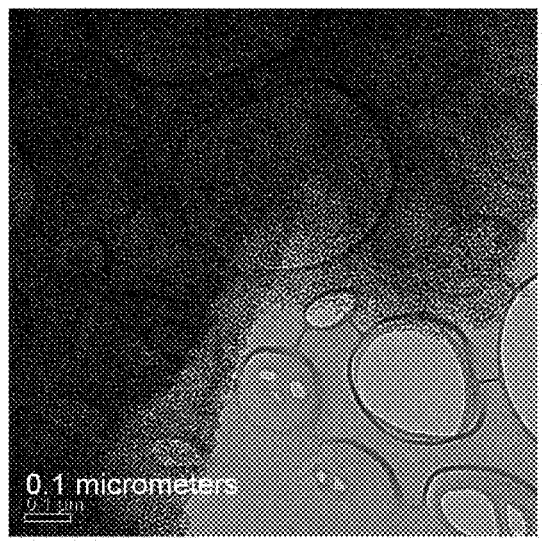
FIG. 2 is a transmission electron microscopic ("TEM") image of a mesoporous oxide complex after calcination prepared in Example 1.

FIG. 2 is a transmission electron microscopic ("TEM") image showing that a Ni catalyst metal prepared by calcination of an oxide and a silica-alumina carrier forms a uniform mesoporous oxide complex of the formula NiO—SiO$_2$—Al$_2$O$_3$.

Figure 3:
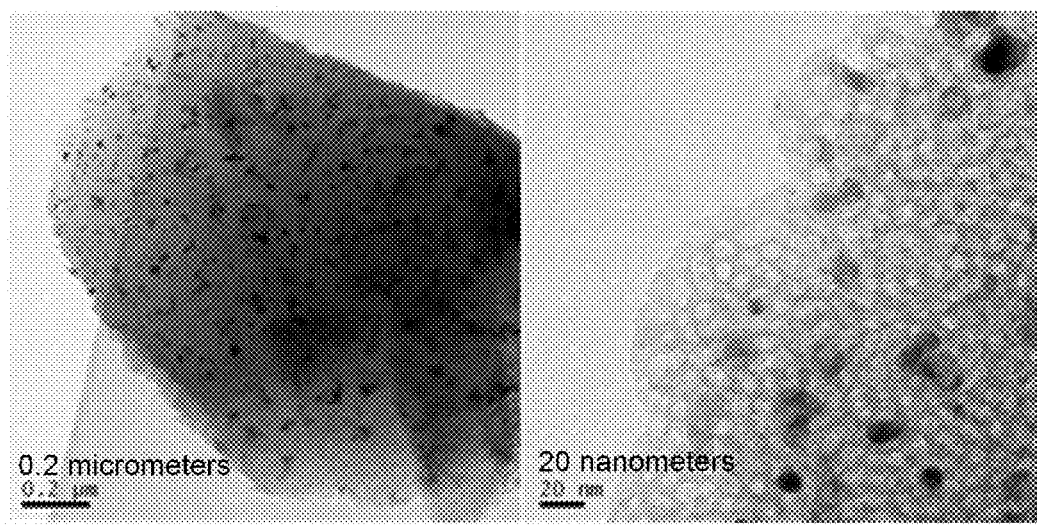
FIG. 3 is a TEM image of the mesoporous oxide-catalyst complex after reduction prepared in Example 1.

FIG. 3 is a TEM image showing that when the oxide complex NiO—SiO$_2$—Al$_2$O$_3$, which is prepared by calcination, is reduced in a hydrogen atmosphere, a Ni metal particle is formed on the surface of a SiO$_2$—Al$_2$O$_3$ carrier pore. In FIG. 3, the Ni metal particle is indicated by a black dot, and the cohesion thereof represents the SiO$_2$—Al$_2$O$_3$ carrier pore.

Figure 4:
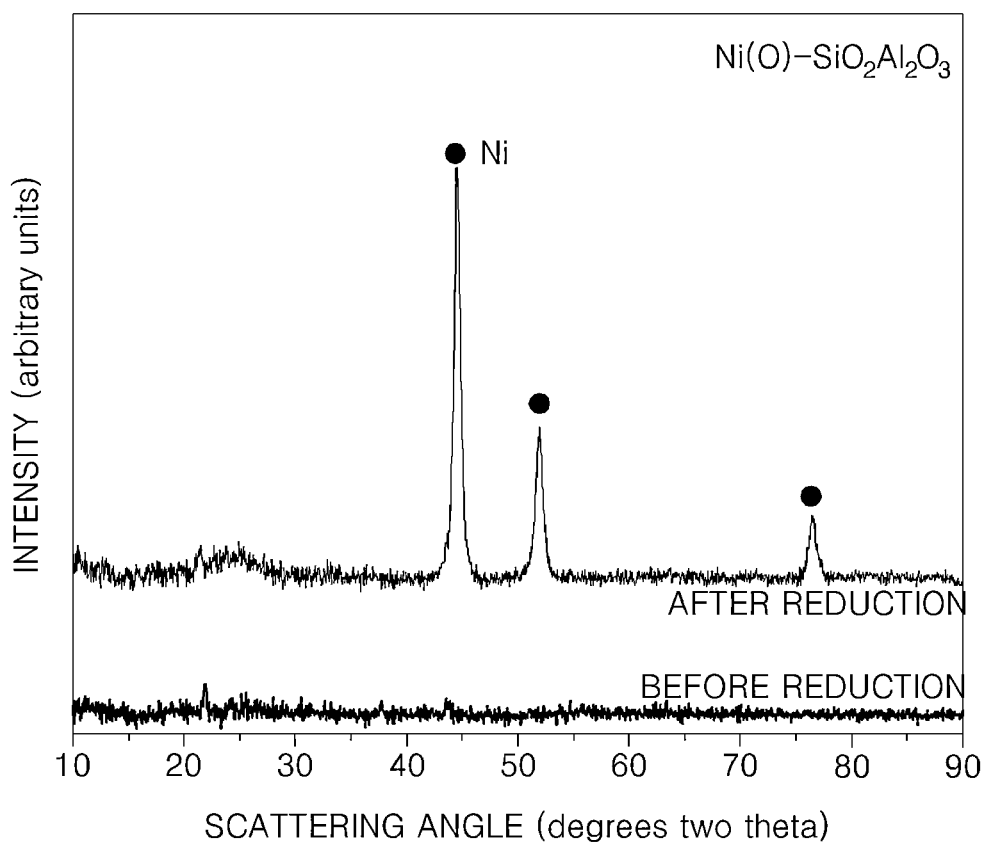
FIG. 4 is a graph of intensity (arbitrary units) versus scattering angle (degrees two theta, 2θ) showing X-ray diffraction ("XRD") results of the mesoporous oxide-catalyst complex prepared in Example 1.

FIG. 4 is a graph showing X-ray diffraction ("XRD") results of the mesoporous oxide-catalyst complex. Referring to FIG. 4, it can be seen that the NiO of the NiO—SiO$_2$—Al$_2$O$_3$ obtained by calcination was reduced to form a Ni metal particle.

Figure 5A:
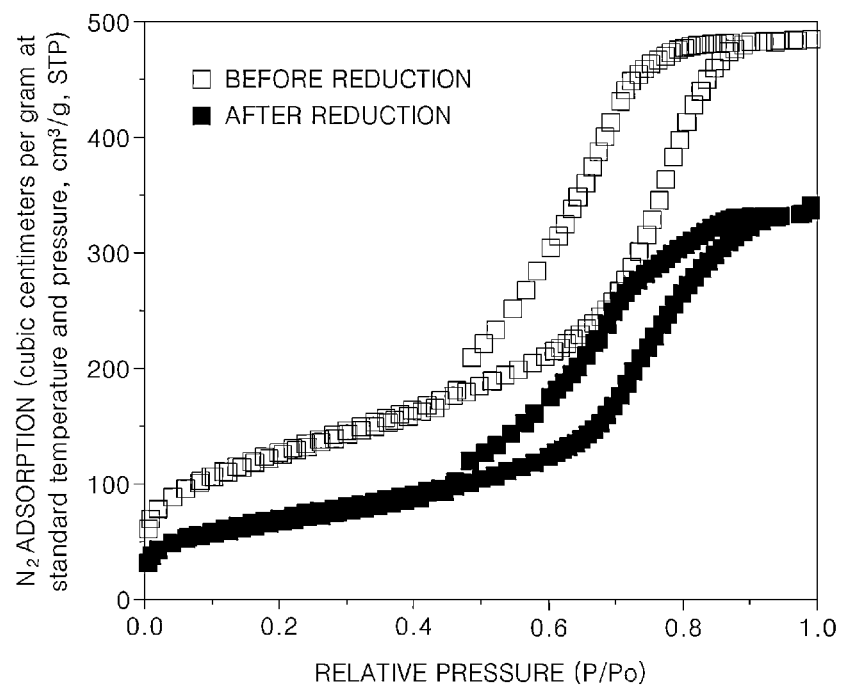
FIG. 5A is a graph of nitrogen adsorption (cubic centimeters per gram at standard temperature and pressure, $cm^3/g$, STP) versus relative pressure showing $N_2$ adsorption results of the mesoporous oxide-catalyst complex prepared in Example 1.
Figure 5B:
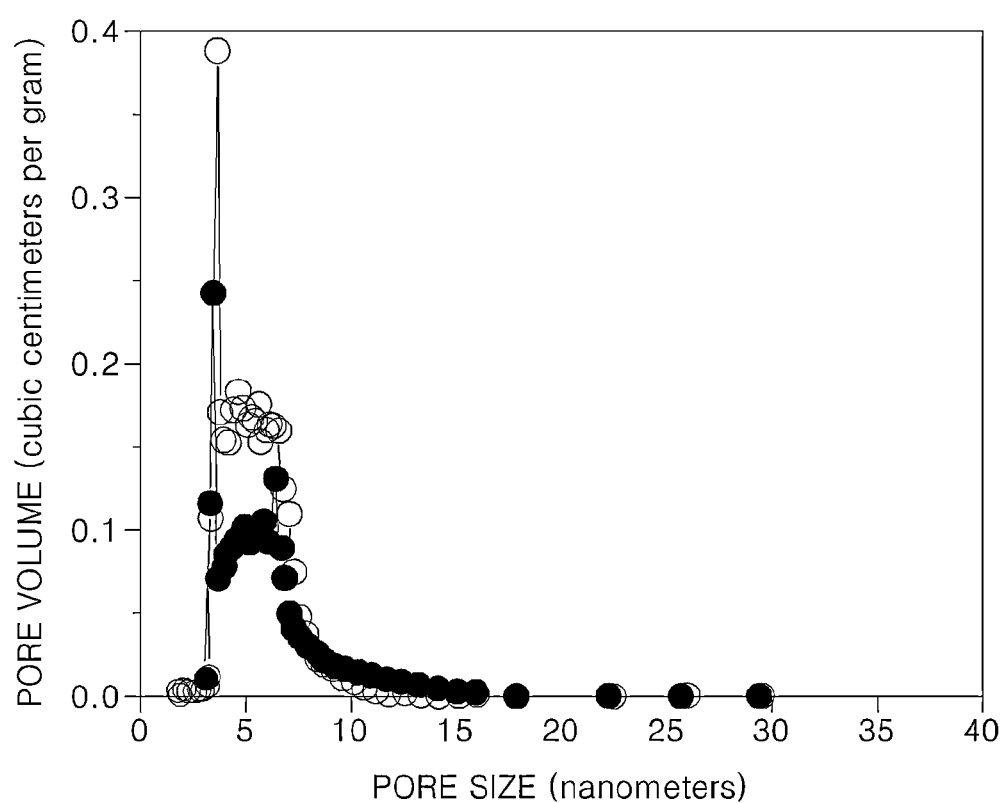
FIG. 5B is a graph of pore volume (cubic centimeters per gram, $cm^3/g$) versus pore size (nanometers, m) showing $N_2$ adsorption results of the mesoporous oxide-catalyst complex prepared in Example 1.

FIGS. 5A and 5B are graphs respectively showing N$_2$ adsorption results and pore size/volume of the mesoporous oxide-catalyst complex prepared in Example 1. Referring to the FIGS. 5A and 5B, it can be seen that even after the reduction of NiO, the mesoporous oxide structure does not collapse and the mesoporous structure is suitably maintained.

Example 2

Preparation of the Mesoporous Oxide-Catalyst Complex 1 Ni/2SiO$_2$-2ZrO$_2$

A mesoporous oxide-catalyst complex of the formula 1 Ni/2SiO$_2$-2ZrO$_2$ was prepared in the same manner as in Example 1, except that 6.5 mmol of Ni(NO$_3$)$_2$·6H$_2$O was used as a catalyst metal precursor, 12.5 mmol of TEOS was used as a metal oxide precursor, and 12.5 mmol of zirconium butoxide was used as a metal oxide precursor instead of 17.5 mmol of aluminum tri-sec-butoxide. The obtained metals had a molar ratio of Ni:Si:Zr of 1:2:2.

Example 3

Preparation of the Mesoporous Oxide-Catalyst Complex 1 Ni/2.5CeO-2.5ZrO$_2$

A mesoporous oxide-catalyst complex of the formula 1 Ni/2.5CeO-2.5ZrO$_2$ was prepared in the same manner as in Example 1, except that 12.5 mmol of Ce(NO$_3$)$_2$ and 12.5 mmol of zirconium butoxide were used instead of 17.5 mmol of TEOS and 17.5 mmol of aluminum tri-sec-butoxide as a metal oxide precursor. The obtained metals had a molar ratio of Ni:Ce:Zr of 1:2.5:2.5.

Example 4

Preparation of the Mesoporous Oxide-Catalyst Complex 1 Ni/5Al$_2$O$_3$

A mesoporous oxide-catalyst complex of the formula 1 Ni/5Al$_2$O$_3$ was prepared in the same manner as in Example 1, except that 25 mmol of tri-sec butoxide was used instead of 17.5 mmol of TEOS and 17.5 mmol of aluminum tri-sec-butoxide as a metal oxide precursor. The obtained metals had a molar ratio of Ni:Al of 1:5.

Example 5

Preparation of the Mesoporous Oxide-Catalyst Complex 1 Ni/5ZrO$_2$

A mesoporous oxide-catalyst complex of the formula 1 Ni/5ZrO$_2$ was prepared in the same manner as in Example 1, except that 25 mmol of zirconium butoxide was used instead of 17.5 mmol of TEOS and 17.5 mmol of aluminum tri-sec-butoxide as a metal oxide precursor. The obtained metals had a molar ratio of Ni:Zr of 1:5.

Example 6

Preparation of the Mesoporous Oxide-Catalyst Complex 1 Ni/2Al$_2$O$_3$-2ZrO$_2$

A mesoporous oxide-catalyst complex of the formula 1 Ni/2Al$_2$O$_3$-2ZrO$_2$ was prepared in the same manner as in Example 1, except that 12.5 mmol of zirconium butoxide and 12.5 mmol of aluminum tri-sec-butoxide were used instead of 17.5 mmol of TEOS and 17.5 mmol of aluminum tri-sec-butoxide as a metal oxide precursor. The obtained metals had a molar ratio of Ni:Al:Zr of 1:2:2.

Experimental Example 1

Figure 6:
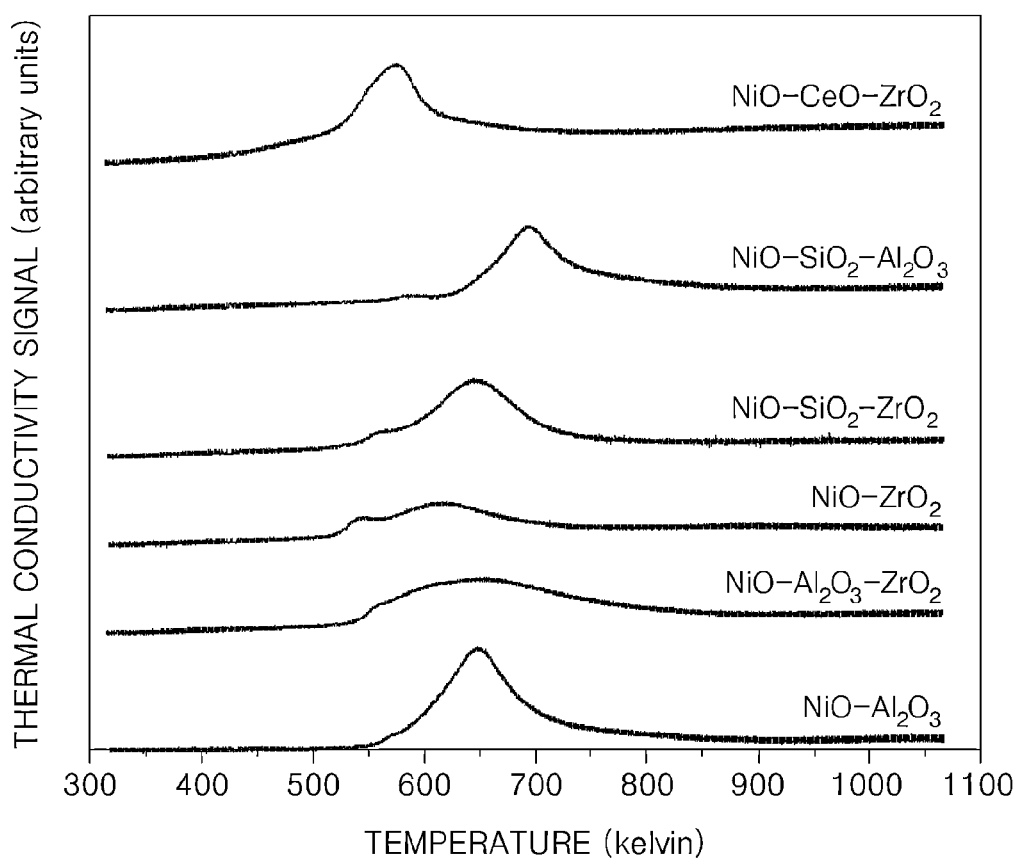
FIG. 6 is a graph of thermal conductivity (arbitrary units) versus temperature (degrees Kelvin) showing the pattern of temperature-programmed reduction of the mesoporous oxide-catalyst complexes prepared in Examples 1 through 6.
Figure 7:
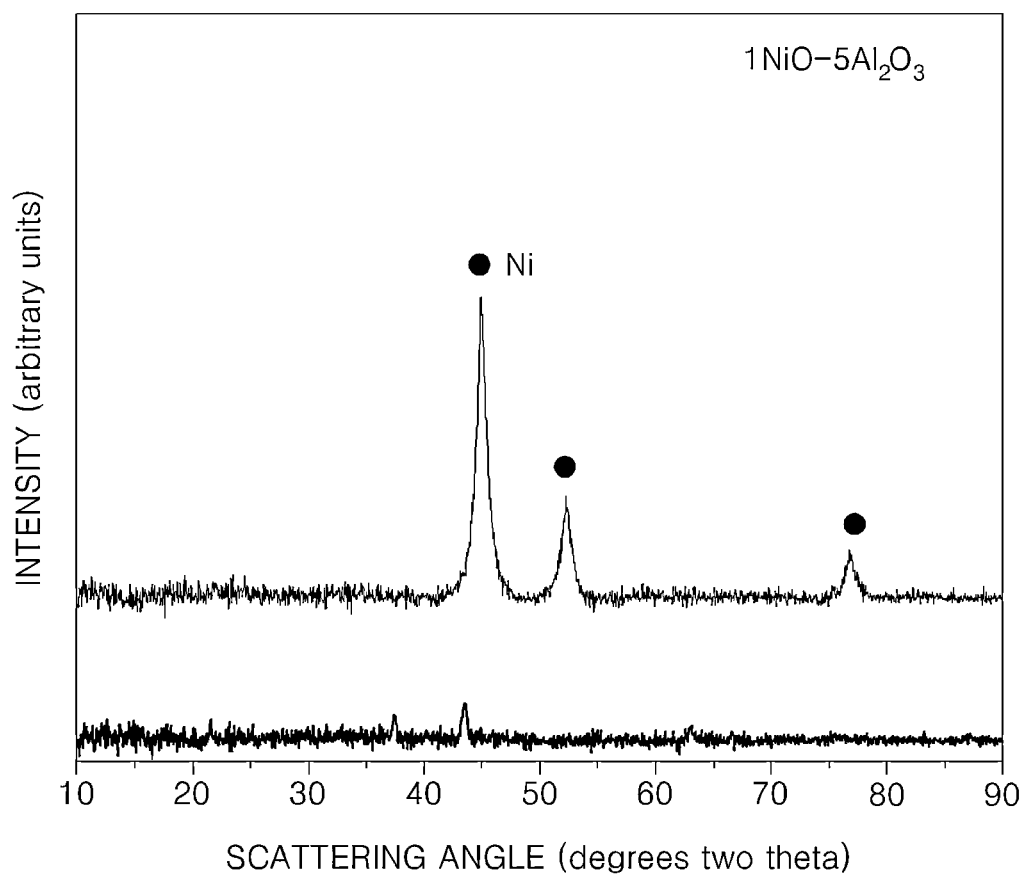
FIGS. 7 through 12 are graphs of intensity (arbitrary units) versus scattering angle (degrees two theta, 2θ) showing XRD results of the mesoporous oxide-catalyst complexes prepared in Examples 4, 5, 1, 2, 6, and 3, respectively.
Figure 8:
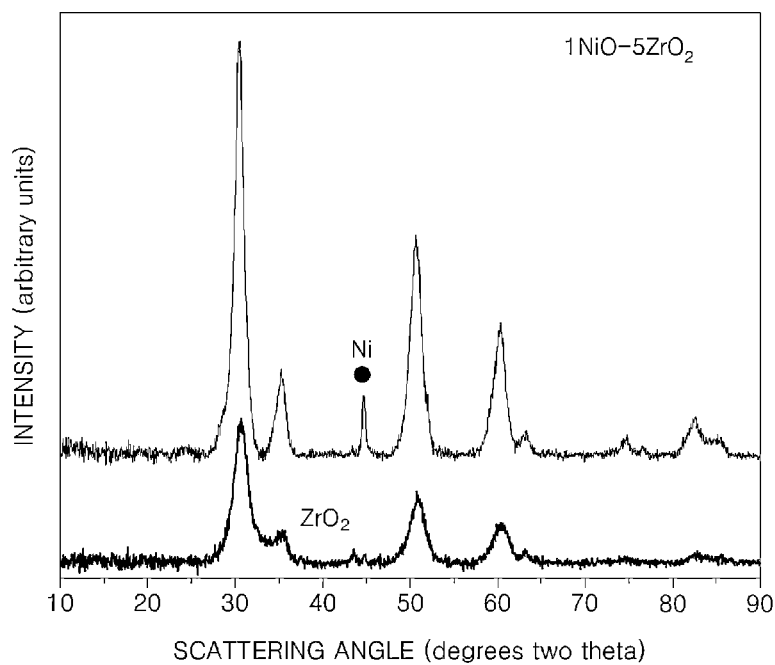
Figure 9:
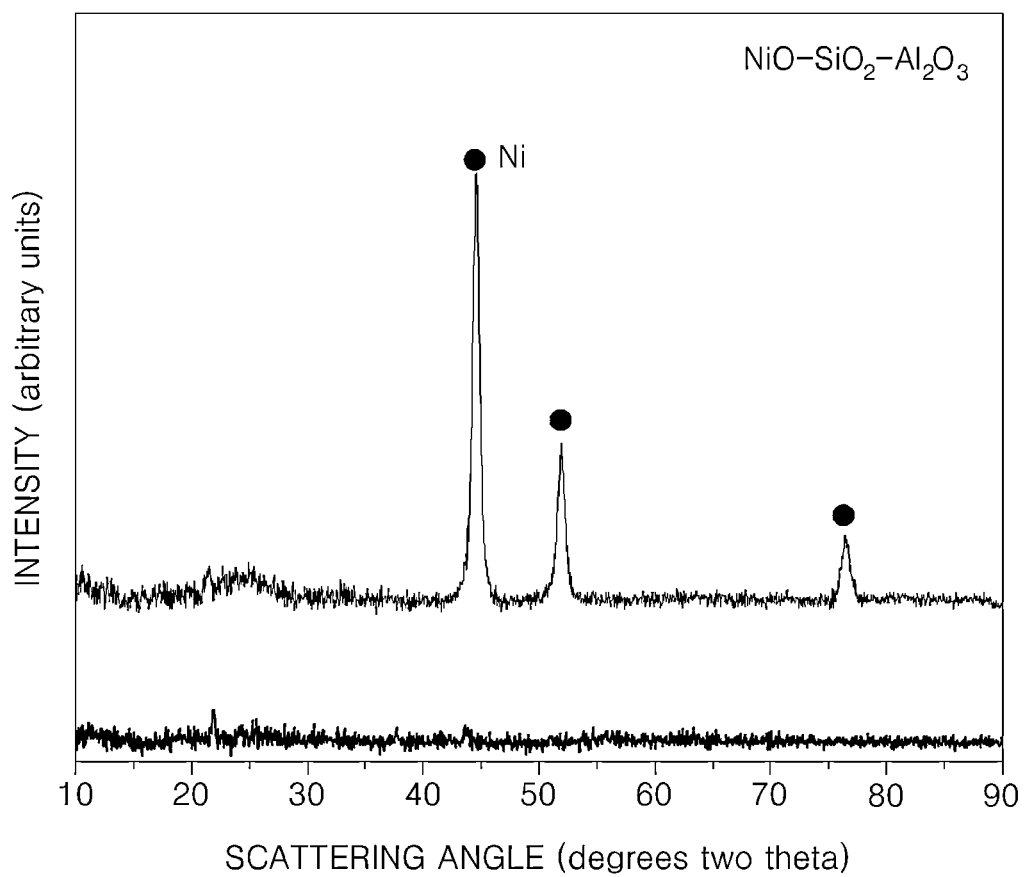
Figure 10:
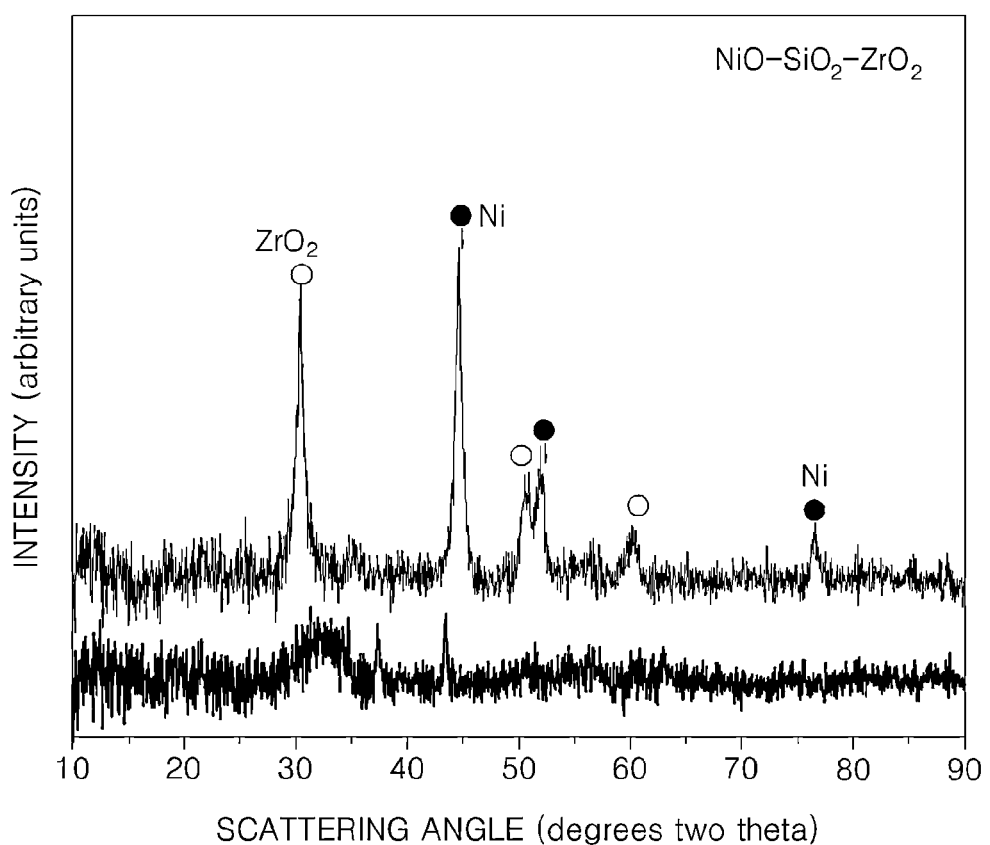
Figure 11:
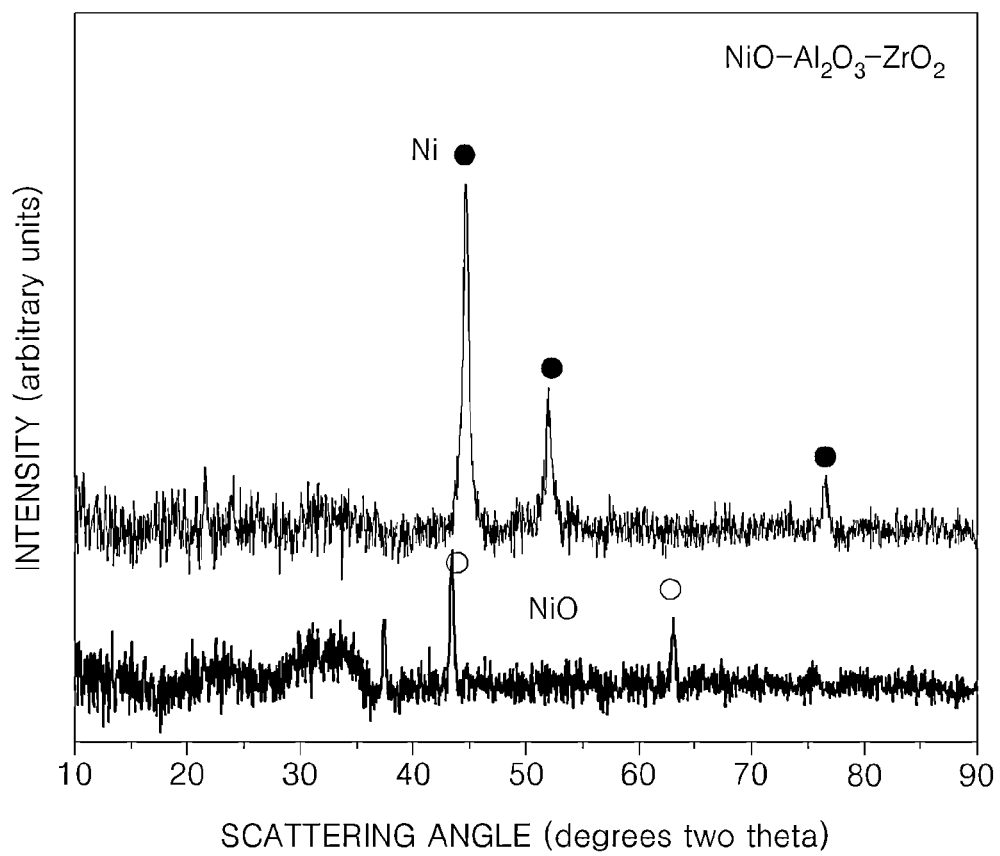
Figure 12:
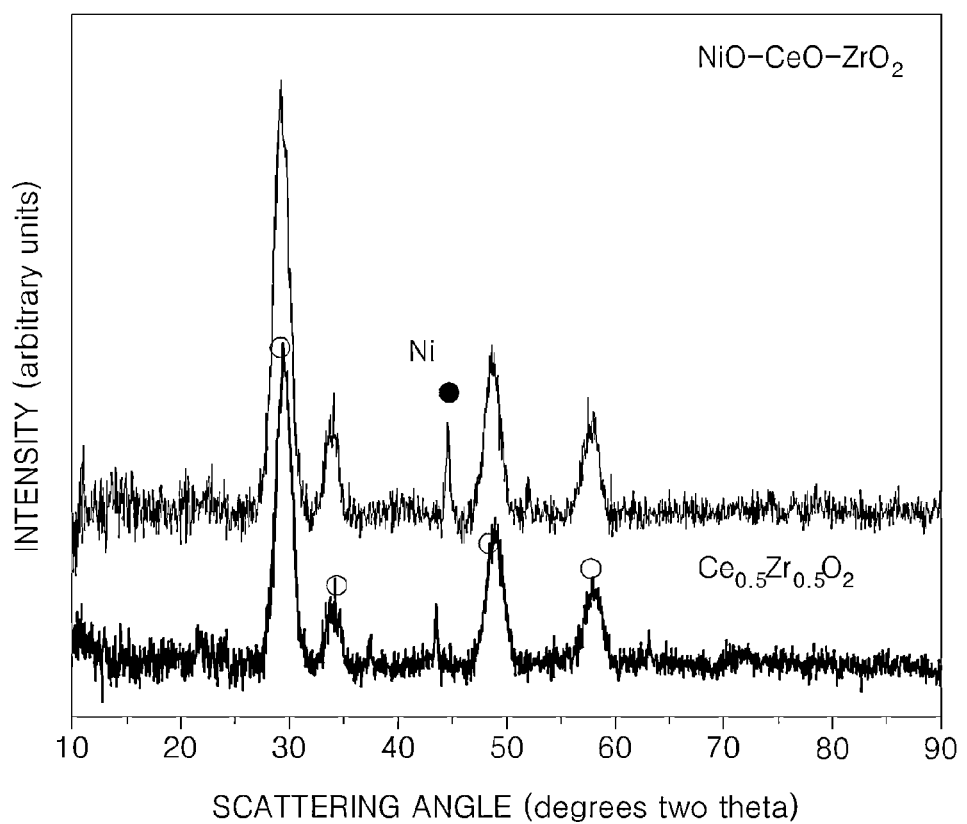

A temperature-programmed reduction process was performed on the mesoporous oxide-catalyst complexes prepared in Examples 1 through 6, and the results are shown in FIG. 6. Referring to the patterns illustrated in FIG. 6, it can be seen that the nickel oxide (NiO) in each mesoporous metal oxide complex is reduced to Ni metal at a temperature of less than about 800 K.

Experimental Example 2

The surface area, pore volume, and pore size of the mesoporous oxide complex including NiO obtained by calcination and the mesoporous oxide supported-Ni catalyst complex obtained by selectively reducing NiO in the mesoporous oxide complex of each of the mesoporous oxide-catalyst complexes of Examples 1 through 6 were measured using a Brunauer-Emmett-Teller ("BET") method, a Barret-Joyner-Halenda ("BJH") method, and a Single Point N$_2$ adsorption method, respectively. The results are shown in Table 1 below.

TABLE 1

| | Mesoporous metal oxide (after calcination) | | | Mesoporous metal oxide (after reduction) | | |
|---|---|---|---|---|---|---|
| | BET surface area (m$^2$/g) | Average pore size (nm) | Total pore volume (cm$^3$/g) | BET surface area (m$^2$/g) | Average pore size (nm) | Total pore volume (cm$^3$/g) |
| Example 1 | 457 | 5.0 | 0.75 | 251 | 5.6 | 0.53 |
| Example 2 | 152 | 5.6 | 0.28 | 143 | 5.2 | 0.26 |
| Example 3 | 41 | 3.9 | 0.08 | 23 | 3.7 | 0.04 |
| Example 4 | 133 | 11.9 | 0.62 | 150 | 11.3 | 0.66 |
| Example 5 | 81 | 6.3 | 0.19 | 72 | 6.6 | 0.17 |
| Example 6 | 55 | 10.1 | 0.21 | 78 | 8.7 | 0.23 |

As shown in Table 1, the mesoporous oxide-catalyst complex of Example 1 has a mesopore and a large surface area after calcination, and maintains the mesoporous structure and large surface area even after reduction.

Experimental Example 3

FIGS. 7 through 12 are graphs showing XRD results of the mesoporous oxide-catalyst complexes of Examples 4, 5, 1, 2, 6, and 3, respectively. From the XRD results, it can be seen that the mesoporous oxide-catalyst complexes of Examples 3 through 5 respectively, form a crystalline mesoporous oxide. Thus, a mesoporous oxide-catalyst complex, wherein a catalyst metal is supported in the crystalline mesoporous oxide, may be prepared.

As described above, according to an embodiment, a mesoporous oxide-catalyst complex in which an active catalyst metal is uniformly dispersed in a mesoporous metal oxide carrier in a large amount may be economically prepared. Thus, when the mesoporous oxide-catalyst complex is used to catalyze a chemical reaction, it may be prepared at low cost and with high efficiency.

It should be understood that the embodiment disclosed herein should be considered in a descriptive sense only and not for purposes of limitation. Descriptions of features, advantages, or aspects of each embodiment should be considered as available for other similar features or aspects in other embodiments.

What is claimed is:

1. A mesoporous oxide-catalyst complex comprising:
    a mesoporous metal oxide; and
    a catalyst metal supported on the mesoporous metal oxide, wherein the catalyst on the mesoporous metal oxide has a degree of dispersion of about 30 to about 90 percent.

2. The mesoporous oxide-catalyst complex of claim 1, wherein the catalyst metal comprises a transition metal.

3. The mesoporous oxide-catalyst complex of claim 1, wherein the catalyst metal comprises at least one of nickel, iron, copper, cobalt, chromium, platinum, palladium, ruthenium, or iridium.

4. The mesoporous oxide-catalyst complex of claim 1, wherein the catalyst metal comprises Ni.

5. The mesoporous oxide-catalyst complex of claim 1, wherein the mesoporous metal oxide comprises at least one oxide of a metal of a Group 4 element, a Group 5 element, a Group 6 element, aluminum, gallium, indium, thallium, silicon, germanium, tin, lead, phosphorous, arsenic, antimony, or bismuth.

6. The mesoporous oxide-catalyst complex of claim 1, wherein the mesoporous metal oxide comprises at least one oxide of at least one of silicon, aluminum, titanium, zirconium, tungsten, molybdenum, vanadium, tantalum, niobium, or phosphorus.

7. The mesoporous oxide-catalyst complex of claim 1, wherein the mesoporous metal oxide comprises at least one of $ZrO_2$, $SiO_2$—$Al_2O_3$, $SiO_2$—$ZrO_2$, $Al_2O_3$—$ZrO_2$, or CeO—$ZrO_2$.

8. The mesoporous oxide-catalyst complex of claim 1, wherein the mesoporous metal oxide is crystalline.

9. The mesoporous oxide-catalyst complex of claim 1, wherein the catalyst metal is contained in an amount of about 0.1 to about 40 mass percent, based on a total amount of the mesoporous oxide-catalyst complex.

10. The mesoporous oxide-catalyst complex of claim 1, wherein the mesoporous metal oxide has an average mesopore diameter of about 1 to about 50 nanometers.

11. The mesoporous oxide-catalyst complex of claim 1, wherein the mesoporous metal oxide has an average mesopore diameter of about 4 to about 15 nanometers.

12. The mesoporous oxide-catalyst complex of claim 1, wherein the mesoporous metal oxide has a surface area of about 20 square meters per gram or greater.

13. A method of preparing a mesoporous oxide-catalyst complex, the method comprising:
    contacting a catalyst metal precursor, a metal oxide precursor, and a solvent to obtain a mixture;
    forming from the mixture a mesoporous structure in which a catalyst metal is included in a lattice structure of a metal oxide derived from the metal oxide precursor;
    calcining the mesoporous structure to obtain a mesoporous metal oxide complex comprising a catalyst metal oxide derived from the catalyst metal precursor; and
    selectively reducing the catalyst metal oxides of the mesoporous metal oxide complex to prepare the mesoporous oxide-catalyst complex.

14. The method of claim 13, wherein the solvent comprises an alcohol and an aqueous acid.

15. The method of claim 13, wherein the catalyst metal precursor comprises an alkoxide, a halide, a nitrate, a hydrochloride, a sulfate or an acetate of a transition metal.

16. The method of claim 13, wherein the catalyst metal precursor comprises a metal ion, and the metal ion is substituted in the lattice structure of the metal oxide.

17. The method of claim 13, wherein the metal oxide precursor comprises an alkoxide, a halide, a nitrate, a hydrochloride, a sulfate or an acetate of at least one metal of a Group 4 element, a Group 5 element, a Group 6 element, aluminum, gallium, indium, thallium, silicon, germanium, tin, lead, phosphorous, arsenic, antimony, or bismuth.

18. The method of claim 13, wherein the calcining is performed at a temperature of about 300 to about 1,000° C. in air for about 0.1 to about 30 hours.

19. The method of claim 13, wherein the reducing is performed at a temperature of about 300 to about 1,000° C. in a gas comprising hydrogen for about 0.01 to about 10 hours.

20. A fuel processing device for a fuel cell, the device comprising a reactor and a hydrocarbon reforming catalyst disposed in the reactor, wherein the hydrocarbon reforming catalyst comprises the mesoporous oxide-catalyst complex according to claim 1.

21. A method of preparing a mesoporous oxide-catalyst complex comprising:
    contacting a catalyst precursor, a mesoporous metal oxide precursor, and a solvent;
    removing the solvent by evaporation to provide a mixture;
    calcining the mixture to convert the catalyst precursor to a catalyst metal oxide and to convert the mesoporous metal oxide precursor to a mesoporous metal oxide thereby providing a mesoporous metal oxide complex comprising the catalyst metal oxide and the mesoporous metal oxide; and
    selectively reducing the catalyst metal oxide of the mesoporous metal oxide complex to prepare the mesoporous oxide-catalyst complex.

22. The method of claim 21, wherein the catalyst precursor comprises at least one of nickel, iron, copper, cobalt, chromium, platinum, palladium, ruthenium, or iridium.

23. The method of claim 21, wherein the mesoporous metal oxide precursor comprises at least one oxide of a metal of a Group 4 element, a Group 5 element, a Group 6 element, aluminum, gallium, indium, thallium, silicon, germanium, tin, lead, phosphorous, arsenic, antimony, or bismuth.

24. The method of claim 21, wherein mesoporous metal oxide complex comprises at least one of $ZrO_2$, $SiO_2$—$Al_2O_3$, $SiO_2$—$ZrO_2$, $Al_2O_3$—$ZrO_2$, or CeO—$ZrO_2$.

25. The method of claim 21, wherein the mesoporous metal oxide complex comprises a complex comprising NiO and $SiO_2$, and the mesoporous oxide-catalyst complex comprises Ni and a complex comprising $SiO_2$.

* * * * *